US010542482B2

(12) United States Patent
Rasanen (10) Patent No.: US 10,542,482 B2
(45) Date of Patent: Jan. 21, 2020

(54) ACCESS CONTROL TO SERVICES IN A NETWORK (71) Applicant: NOKIA SOLUTIONS AND NETWORKS OY, Espoo (FI)

(72) Inventor: John Juha Antero Rasanen, Espoo (FI)

(73) Assignee: NOKIA SOLUTIONS AND NETWORKS OY, Espoo (FI)

(*) Notice: Subject to any disclaimer, the term of this patent is extended or adjusted under 35 U.S.C. 154(b) by 0 days.

(21) Appl. No.: 15/550,539

(22) PCT Filed: Feb. 12, 2015

(86) PCT No.: PCT/EP2015/052971
§ 371 (c)(1),
(2) Date: Aug. 11, 2017

(87) PCT Pub. No.: WO2016/128055
PCT Pub. Date: Aug. 18, 2016

(65) Prior Publication Data
US 2018/0035360 A1 Feb. 1, 2018

(51) Int. Cl.
*H04W 48/14* (2009.01)
*H04W 8/06* (2009.01)
(Continued)

(52) U.S. Cl.
CPC ............ *H04W 48/14* (2013.01); *H04W 8/06* (2013.01); *H04W 60/00* (2013.01); *H04W 12/08* (2013.01); *H04W 48/16* (2013.01)

(58) Field of Classification Search
CPC ....... H04W 48/18; H04W 48/16; H04W 8/06; H04W 48/14; H04W 76/02; H04W 48/08;
(Continued)

(56) References Cited

U.S. PATENT DOCUMENTS 6,891,842 B2 * 5/2005 Sahaya ................ H04L 12/66
370/401
7,206,859 B2 * 4/2007 Narayanan ............ H04W 8/082
709/224

(Continued)

FOREIGN PATENT DOCUMENTS

EP 2 590 456 A1 5/2013

OTHER PUBLICATIONS

International Search Report & Written Opinion dated Nov. 13, 2015 corresponding to International Patent Application No. PCT/EP2015/052971.

(Continued)

*Primary Examiner* — Magdi Elhag
(74) *Attorney, Agent, or Firm* — Squire Patton Boggs (US) LLP (57) ABSTRACT Various communication services may benefit from access controls. For example, certain wireless communication systems may benefit from access control to services in a network, such as access to services at mobile edge as distinct from core network services. A method can include initiating an attachment to a network. The method can also include indicating, while initiating the attachment, at least one user equipment request with respect to local mobile edge computing services or mobile edge computing applications.

14 Claims, 7 Drawing Sheets (51) Int. Cl.
*H04W 60/00* (2009.01)
*H04W 12/08* (2009.01)
*H04W 48/16* (2009.01)

(58) Field of Classification Search
CPC ............... H04W 76/027; H04W 48/02; H04W 74/0833; H04W 76/028; H04W 48/00
See application file for complete search history.

(56) References Cited

U.S. PATENT DOCUMENTS

| | | | | |
|---|---|---|---|---|
| 9,185,545 | B2* | 11/2015 | Yeoum | H04W 8/082 |
| 2005/0181776 | A1* | 8/2005 | Verma | H04W 48/16 |
| | | | | 455/418 |
| 2011/0171953 | A1 | 7/2011 | Faccin et al. | |
| 2013/0114567 | A1* | 5/2013 | Bojeryd | H04W 36/0022 |
| | | | | 370/332 |
| 2016/0044531 | A1* | 2/2016 | Papa | H04W 28/0247 |
| | | | | 370/230 |
| 2018/0035360 | A1* | 2/2018 | Rasanen | H04W 8/06 |

OTHER PUBLICATIONS

R. Guerzoni et al: "SDN-based architecture and procedures for 5G networks," 1st International Conference on 5G for Ubiquitous Connectivity, ICST, Nov. 26, 2014, pp. 209-214, XP032735026.

ETSI Mobile-Edge Computing—Introductory Technical White Paper; 2014.

ISG MEC#1 Minutes of Plenary Meeting, ITS(14)01_038; ETSI 2014.

3GPP TS 23.401 V13.1.0 (Dec. 2014); 3rd Generation Partnership Project; Technical Specification Group Services and System Aspects; General Packet Radio Service (GPRS) enhancements for Evolved Universal Terrestrial Radio Access Network (E-UTRAN) access (Release 13).

* cited by examiner

ACCESS CONTROL TO SERVICES IN A NETWORK

BACKGROUND

Field

Various communication services may benefit from access controls. For example, certain wireless communication systems may benefit from access control to services in a network, such as access to services at mobile edge as distinct from core network services.

Description of the Related Art

European Telecommunications Standards Institute (ETSI) industry specification group (ISG) on mobile edge computing (MEC) aims to create specifications on mobile edge computing. Applications and services offered by an MEC server may be provided by different service providers.

Applications and services offered by a MEC server may be used by third generation partnership project (3GPP) mobile network users/subscribers either in sessions between a user equipment (UE) and MEC server or as intermediate data flow manipulators in sessions between a UE and, for example, the Internet.

In connection with mobile edge computing, a mobile subscriber may want to limit or prevent data traffic and/or usable services or applications, especially in various roaming situations. Many current UEs support a UE local “Data-Off” state for this purpose. In Data-Off state, the UE does not send any data packets to activate data services and does not react to any possibly received packets of data applications. If a network supports local services or applications on a mobile edge computing server or servers, these are not available to a UE in Data-Off state, even when the services or applications are local and do not incur high roaming related costs for roaming users.

Discussion of mobile edge computing can be seen in Mobile-Edge Computing—Introductory Technical White Paper, September 2014 (Contributors: Huawei, IBM, Intel, Nokia Networks, NTT DOCOMO, Vodafone), which is hereby incorporated herein by reference in its entirety. See also, ETSI ITS(14)01_038: ISG MEC#1 Minutes of Plenary Meeting, which is also hereby incorporated herein by reference in its entirety.

FIG. 1 illustrates an architectural environment of a conventional view of mobile edge computing, in a simplified example. Thus, FIG. 1 illustrates a simplified architecture with MEC server at 3GPP radio network edge. Further details concerning the MEC part can be found in the prior art White Paper. Further details concerning the 3GPP network part can be found e.g. in 3GPP TS 23.401.

As shown in FIG. 1, a first mobile edge computing server, MEC server #1, can be provided at a first evolved Node B (eNB) or first set of eNBs, and a second mobile edge computing server, MEC server #2, can be provided at a second eNB or second set of eNBs.

SUMMARY

According to certain embodiments, a method can include initiating an attachment to a network. The method can also include indicating, while initiating the attachment, at least one user equipment request with respect to local mobile edge computing services or mobile edge computing applications.

In certain embodiments, a method can include receiving, for a network attachment, at least one user equipment request with respect to local mobile edge computing services or mobile edge computing applications. The method can also include providing a response to the at least one user equipment request, wherein the response is configured to indicate a network capability with respect to the local mobile edge computing services or mobile edge computing applications.

An apparatus, according to certain embodiments, can include means for initiating an attachment to a network. The apparatus can also include means for indicating, while initiating the attachment, at least one user equipment request with respect to local mobile edge computing services or mobile edge computing applications.

An apparatus, in certain embodiments, can include means for receiving, for a network attachment, at least one user equipment request with respect to local mobile edge computing services or mobile edge computing applications. The apparatus can also include means for providing a response to the at least one user equipment request, wherein the response is configured to indicate a network capability with respect to the local mobile edge computing services or mobile edge computing applications.

According to certain embodiments, an apparatus can include at least one processor and at least one memory including computer program code. The at least one memory and the computer program code can be configured to, with the at least one processor, cause the apparatus at least to initiate an attachment to a network. The at least one memory and the computer program code can also be configured to, with the at least one processor, cause the apparatus at least to indicate, while initiating the attachment, at least one user equipment request with respect to local mobile edge computing services or mobile edge computing applications.

In certain embodiments, an apparatus can include at least one processor and at least one memory including computer program code. The at least one memory and the computer program code can be configured to, with the at least one processor, cause the apparatus at least to receive, for a network attachment, at least one user equipment request with respect to local mobile edge computing services or mobile edge computing applications. The at least one memory and the computer program code can also be configured to, with the at least one processor, cause the apparatus at least to providing a response to the at least one user equipment request, wherein the response is configured to indicate a network capability with respect to the local mobile edge computing services or mobile edge computing applications.

A non-transitory computer-readable medium can, according to certain embodiments, be encoded with instructions that, when executed in hardware, perform a method. The method can include initiating an attachment to a network. The method can also include indicating, while initiating the attachment, at least one user equipment request with respect to local mobile edge computing services or mobile edge computing applications.

A non-transitory computer-readable medium can, in certain embodiments, be encoded with instructions that, when executed in hardware, perform a method. The method can include receiving, for a network attachment, at least one user equipment request with respect to local mobile edge computing services or mobile edge computing applications. The method can also include providing a response to the at least one user equipment request, wherein the response is configured to indicate a network capability with respect to the local mobile edge computing services or mobile edge computing applications.

According to certain embodiments, a computer program product can encode instructions for performing a method. The method can include initiating an attachment to a network. The method can also include indicating, while initiating the attachment, at least one user equipment request with respect to local mobile edge computing services or mobile edge computing applications.

In certain embodiments, a computer program product can encode instructions for performing a method. The method can include receiving, for a network attachment, at least one user equipment request with respect to local mobile edge computing services or mobile edge computing applications. The method can also include providing a response to the at least one user equipment request, wherein the response is configured to indicate a network capability with respect to the local mobile edge computing services or mobile edge computing applications.

BRIEF DESCRIPTION OF THE DRAWINGS

For proper understanding of the invention, reference should be made to the accompanying drawings, wherein.

DETAILED DESCRIPTION

Certain embodiments provide a set of measures, steps, and/or procedures that may enable a user and/or user equipment (UE) to limit access to mobile edge computing (MEC) services and/or applications only, or to MEC services and a limited set of services and/or applications offered via a core network. These measures may be applied in various combinations.

When a UE attaches a network, the UE may indicate that the UE requests or needs only local MEC services or applications. The UE may further request limited traffic and/or services via the core network and/or packet data network (PDN) gateway (P-GW). For example, the UE may indicate services or applications that are allowed or not allowed via the core network. The UE may further indicate or identify MEC services to request a certain service or services or to find out whether a certain service or services are available in the network.

The network may, in response to the UE's indication or request, indicate support with various granularity. For example, the network may indicate MEC supported, supported MEC services and/or applications, and/or access limited to MEC supported. If the network does not understand the MEC related parameters, the attach can fall back to a normal procedure.

If the network indicates support of what the UE requested, the attach procedure can be completed and the UE may inform the user. The network indication in this case may be, for example, MEC availability or availability of certain MEC services or limitation of services via the core network/P-GW.

If the network indicates that at least one issue requested by the UE (for example, MEC availability in general or at least one MEC service or core network service limitation) is not available/possible, the UE may indicate this shortcoming to the user and may ask whether the attach is completed or whether the UE should detach from the network and possibly re-attach with new parameters.

The operations of such an approach may be realized in various ways in various embodiments. The following are some non-limiting examples.

Figure 1:
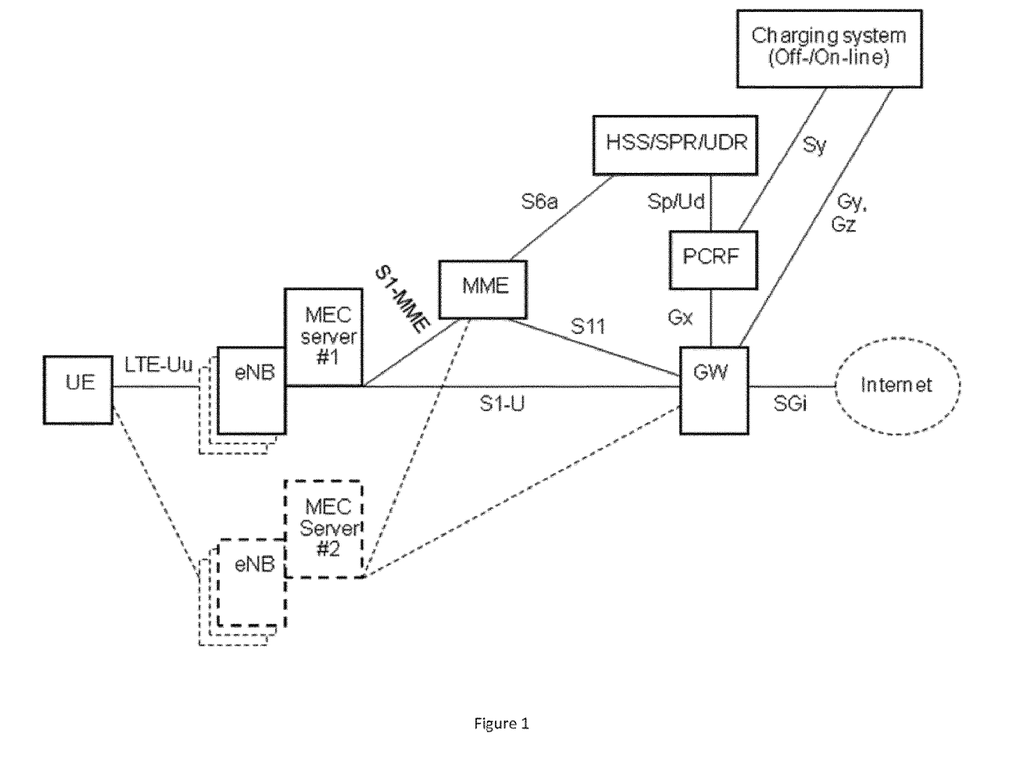
FIG. 1 illustrates an architectural environment of a conventional view of mobile edge computing, in a simplified example.
Figure 2:
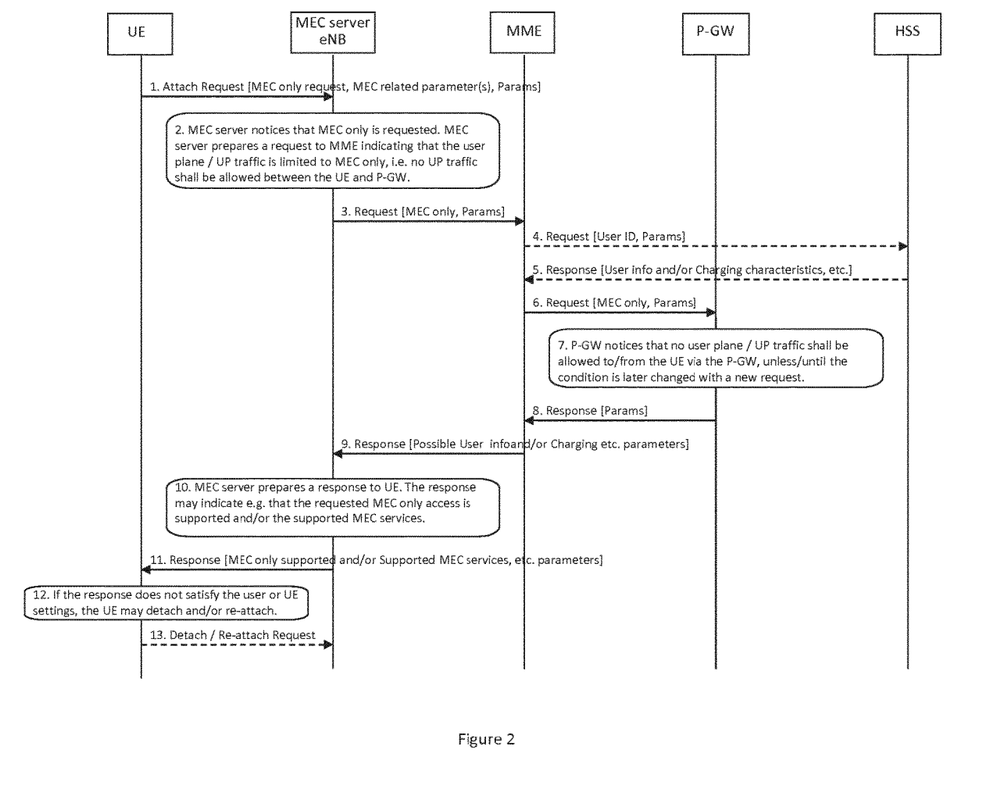
FIG. 2 illustrates a UE attach to MEC only scenario in which both MME and P-GW are involved, according to certain embodiments.

FIG. 2 illustrates a UE attach to MEC only scenario in which both MME and P-GW are involved, according to certain embodiments. More particularly, FIG. 2 illustrates a UE attach to MEC only scenario where MME and P-GW are involved even if pure MEC services are used/requested by the UE.

At 1, the UE can request MEC only services. Then, at 2, the MEC server can notice that MEC only is requested. The MEC server can prepare a request to the MME at 3, indicating that the user plane (UP) traffic is limited to MEC only. For example, the MEC server can request that no user plane traffic be allowed between the UE and P-GW. The MEC server may indicate this in different ways, for example, with all-blocking packet filters or with zero requested quality of service (QoS), thus effectively keeping the default context between the MEC server and P-GW purely as a control plane context without user traffic/data. Another alternative is that a dedicated parameter may be used to indicate the "MEC only" condition.

The MME can, at 4, request information regarding the user from the HSS. The HSS can provide a response at 5. At 6, the MME can request MEC only treatment to the P-GW. The P-GW, at 7, can notice that no UP traffic is to be allowed to/from the UE via the P-GW, unless or until the condition is later changed with a new request. Other ways of handling the request, such as setting a timer during which MEC only treatment is provided, is also possible.

At 8, the P-GW can provide a response to the MME. Similarly, at 9, the MME can provide a response to the MEC server. Then, at 10, the MEC server can prepare a response to the UE. The response can indicate, for example, that the requested MEC only access is supported and/or the specific supported MEC services.

At 11, the MEC server can provide a response to the UE. At 12, if the response from the network does not satisfy the user or UE settings, the UE may, at 13, detach from and/or re-attach with new parameters to the network.

Figure 3:
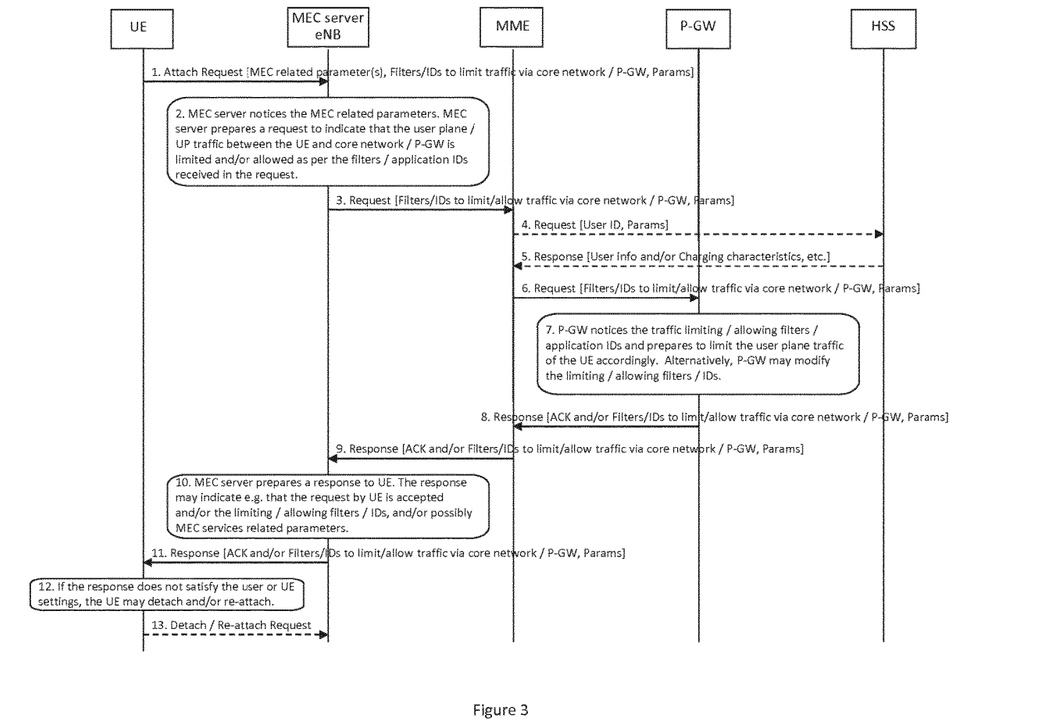
FIG. 3 illustrates a UE attach and traffic/services with core network/P-GW limited, according to certain embodiments.

FIG. 3 illustrates a UE attach and traffic/services with core network/P-GW limited, according to certain embodiments. As shown in FIG. 3, at 1, the UE may request MEC services in general or certain identified MEC services and indicate limitations to the traffic via the core network. For example, the UE may indicate, with packet filters and/or service identifiers, the services or applications that are allowed or not allowed via the core network. The requested core network limitations may be conditional. For example, the limitations may be valid if MEC services are available.

The remainder of the flow may be similar to that shown in FIG. 2. However, in this case, rather than MEC only, the detected request may be for P-GW limited. Thus, at 2 the MEC server may notice the MEC related parameters. MEC server may prepare a request to indicate that the user plane traffic between the UE and core network/P-GW is limited and/or allowed as per the filters/application IDs received in the request.

Similarly, at 7, the P-GW may notice the traffic limiting/allowing filters/application IDs and may prepare to limit the user plane traffic of the UE accordingly. Alternatively, P-GW may modify the limiting/allowing filters/IDs. The P-GW may notify the MME of such changes at 8.

At 10, the MEC server may prepare a response to UE. The response may indicate, for example, that the request by UE is accepted and/or the limiting/allowing filters/IDs, and/or possibly MEC services related parameters.

As in the previous example, if the response from the network does not satisfy the user or UE settings, the UE may detach from and/or re-attach with new parameters to the network.

Figure 4:
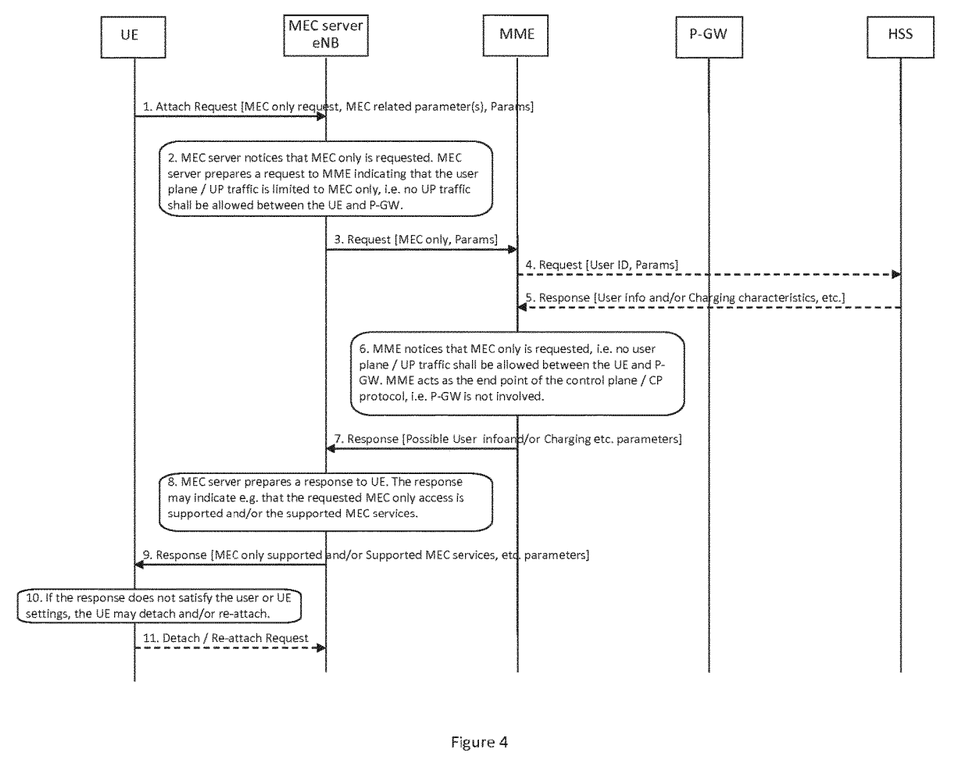
FIG. 4 illustrates a UE attach to MEC only scenario where MME is involved, according to certain embodiments.

FIG. 4 illustrates a UE attach to MEC only scenario where MME is involved, according to certain embodiments. For example, FIG. 4 illustrates a case in which the MME is involved, when pure MEC services are used/requested by the UE.

As shown in FIG. 4, at 1, the UE can request MEC only services. Then, at 2, the MEC server can notice that MEC only is requested. The MEC server can prepare a request, at 3, to the MME indicating that the user plane traffic is limited to MEC only. Thus, no UP traffic may be allowed between the UE and P-GW.

After requesting and receiving information regarding the UE at 4-5, at 6, the MME can notice that MEC only is requested. Thus, no user plane traffic may be allowed between the UE and P-GW. The MME can act as the end point of the control plane (CP) protocol. Thus, in this example the P-GW may not be involved.

The process can then continue as in other examples. For example, at 8, the MEC server can prepare a response to UE. The response at 9 may indicate, for example, that the requested MEC only access is supported and/or the supported MEC services. As in the previous examples, at 12, if the response from the network does not satisfy the user or UE settings, at 13 the UE may detach from and/or re-attach with new parameters to the network.

Figure 5:
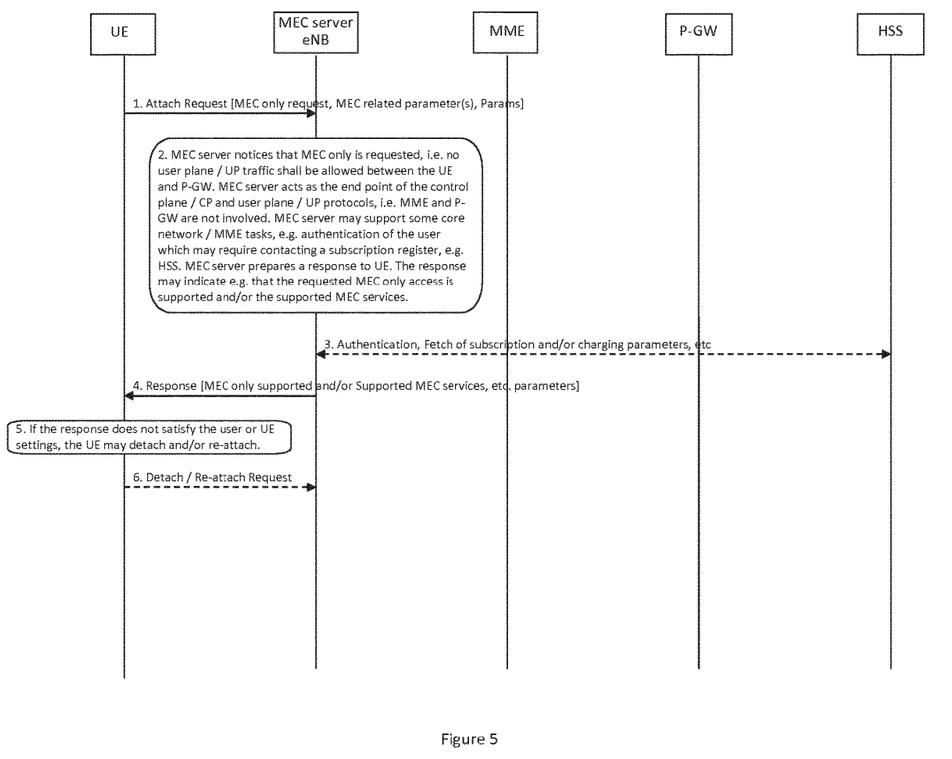
FIG. 5 illustrates a UE attach to MEC only scenario, in which the MEC server acts as a GW, and MME and P-GW are not involved, according to certain embodiments.

FIG. 5 illustrates a UE attach to MEC only scenario, in which the MEC server acts as a GW, and MME and P-GW are not involved, according to certain embodiments. More particularly, FIG. 5 illustrates a scenario in which MME and P-GW are not involved when pure MEC services are used/requested by the UE.

As shown in FIG. 5, at 1, the UE can request MEC only services. At 2, the MEC server can notice that MEC only is requested and that consequently no user plane (UP) traffic is to be allowed between the UE and P-GW. The MEC server can act as the end point of the control plane and user plane protocols. Thus, the MME and P-GW may not need to be involved. The MEC server may support some core network/MME tasks, such as authentication of the user, which may involve at 3 contacting a subscription register, such as a home subscriber server (HSS). The MEC server can prepare a response to the UE. The response at 4 may indicate, for example, that the requested MEC only access is supported and/or the supported MEC services.

As in the previous examples, at 5, if the response from the network does not satisfy the user or UE settings, the UE may, at 6, detach from and/or re-attach with new parameters to the network.

The above architectural solutions are possible, as shown and described in FIGS. 2, 3, 4 and 5. More particularly, FIGS. 2 and 3 describe implementations that may be implemented with no or small impact on the current 3GPP core network architecture.

FIG. 4 describes an implementation that may reduce the use of the packet core network for pure MEC services, but may still use MME, for example for authentication and possibly for fetching subscriber data and/or charging characteristics.

FIG. 5 describes a highly integrated MEC only solution which may have no direct impact on the packet core network. This solution, however, may involve some related functionality on the MEC server.

Various embodiments may have benefits and/or advantages. For example, limiting data traffic and/or usable services may provide cost savings, battery saving, privacy, or the like. Thus, certain embodiments may provide these and other benefits and/or advantages.

Figure 6:
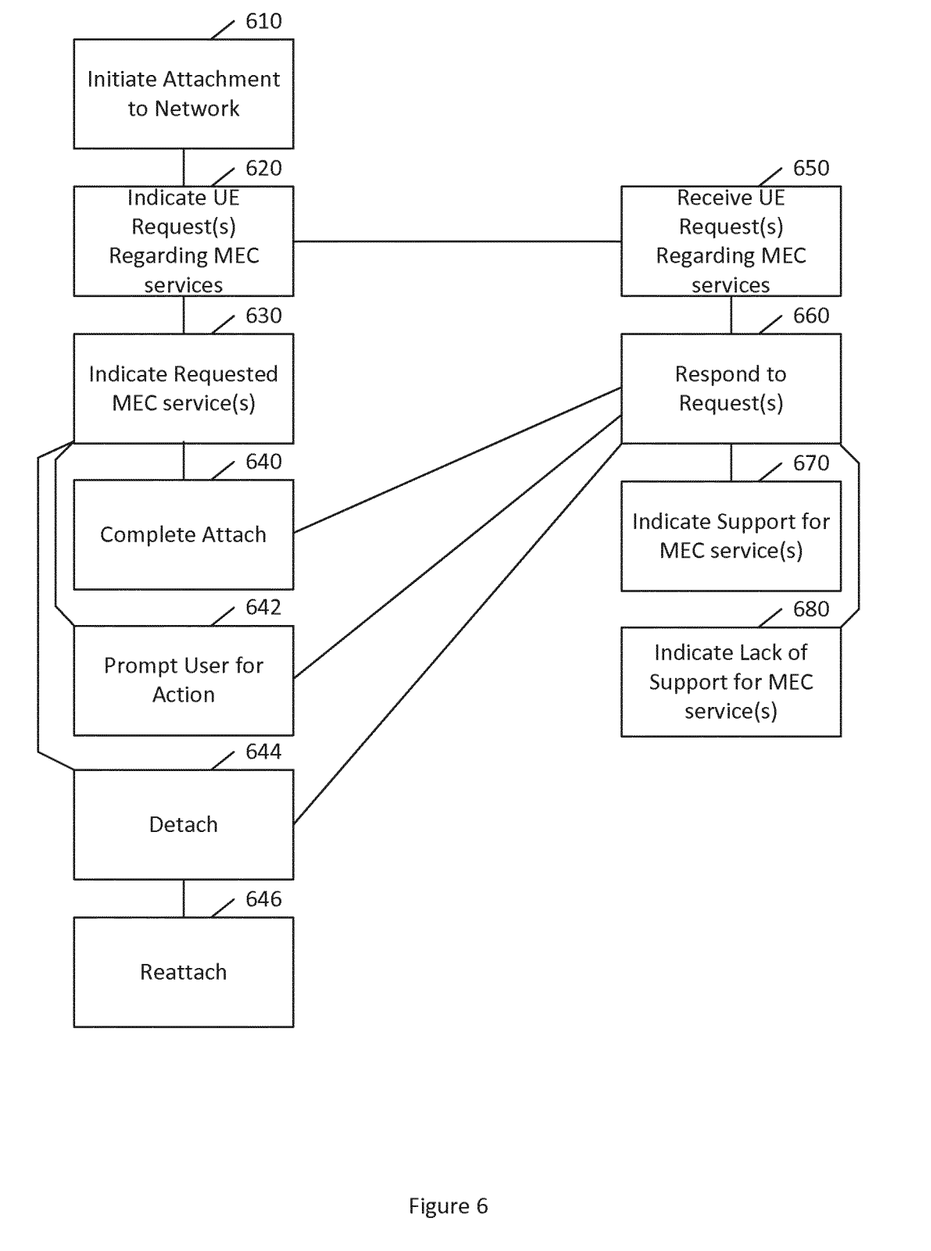
FIG. 6 illustrates a method according to certain embodiments.

FIG. 6 illustrates a method according to certain embodiments. The method illustrated in FIG. 6 may be related to and may incorporate aspects of one or more of the flows illustrated in FIGS. 2, 3, 4, and 5.

As shown in FIG. 6, a method can include, at 610, initiating an attachment to a network. The method can also include, at 620, indicating, while initiating the attachment, at least one user equipment request with respect to local mobile edge computing services or mobile edge computing applications. This request can be provided in the same method that requests attachment or otherwise as part of the attachment process.

The at least one user equipment request can include a request to limit access to mobile edge computing services and/or applications only. Alternatively, the at least one user equipment request can include a request to limit access to mobile edge computing services and/or applications and at least one of a limited set of core network services and/or applications, or a limited set of packet data network gateway services and/or applications. In certain embodiments, packet data network gateway services and/or applications can be considered core network services and/or applications.

In another aspect, the at least one user equipment request may include a request to prohibit access to or use of at least one core network service or core network application.

The method can also include, at 630, identifying at least one requested mobile edge computing service with the at least one user equipment request. This identified service can be a service that the user equipment wishes to receive via mobile edge computing only, in case the service is one that can be provided a variety of ways.

The method can further include, at 640, completing attachment upon receiving an affirmative response from a network in response to the at least one user equipment request.

Alternatively, or in addition, the method can include, at 642, prompting a user for input upon receiving a negative response from a network in response to the at least one user equipment request. The user equipment can respond to any user input provided. A negative response may be any non-satisfying response. For example, a non-satisfying response from the network may be that network does not offer or support everything that the UE requests. Thus, a negative response may be a response that is negative for at least one of the requests. Accordingly, a negative response may be any response from the network does not fully satisfy the user or UE settings.

The method can also include, at 644, detaching upon receiving a negative response from a network in response to the at least one user equipment request. Optionally, the method can also include, at 646, reattaching to the same or another network, for example to attempt the same request of another network or a different request from the same network. Thus, the reattaching to the network can be performed with at least one new parameter with respect to local mobile edge computing services or mobile edge computing applications. For example, one or more fewer or different local mobile edge computing services or mobile edge computing applications may be requested.

The at least one user equipment request can comprise a conditional core network limitation. For example, the request may be expressed such that the limitations mentioned are valid only if MEC services, or a specific minimum or subset of such services, are available.

The method can also include, at 650, receiving, for a network attachment, at least one user equipment request with respect to local mobile edge computing services or mobile edge computing applications. This may be the same request provided at 620.

The method can also include, at 660, providing a response to the at least one user equipment request, wherein the response is configured to indicate a network capability with respect to the local mobile edge computing services or mobile edge computing applications. This may be the same response considered at 640, 642, and/or 644.

The method can also include, at 670, providing with the response indication of support for at least one mobile edge computing service. The method can further include, at 680, providing with the response indication of unavailability of at least one mobile edge computing service.

Figure 7:
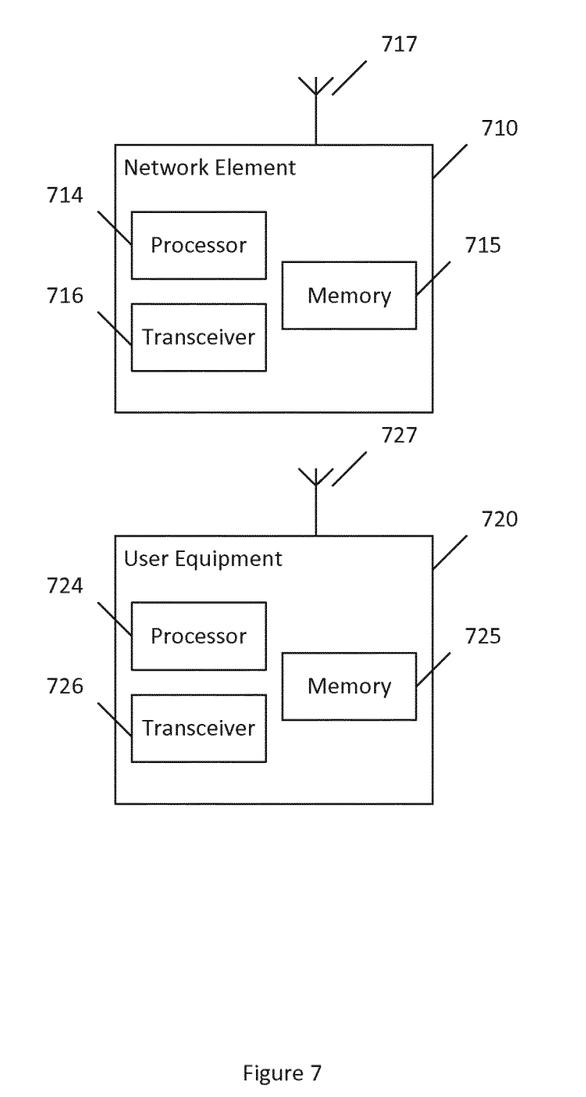
FIG. 7 illustrates a system according to certain embodiments.

FIG. 7 illustrates a system according to certain embodiments of the invention. It should be understood that each block of the flowchart of FIG. 6 may be implemented by various means or their combinations, such as hardware, software, firmware, one or more processors and/or circuitry. In one embodiment, a system may include several devices, such as, for example, network element 710 and user equipment (UE) or user device 720. The system may include more than one UE 720 and more than one network element 710, although only one of each is shown for the purposes of illustration. A network element can be an access point, a base station, an eNode B (eNB), or any other network element, such as any of the core network elements illustrated in FIGS. 1-5. In particular embodiments, network element 710 may be a MEC server. Each of these devices may include at least one processor or control unit or module, respectively indicated as 714 and 724. At least one memory may be provided in each device, and indicated as 715 and 725, respectively. The memory may include computer program instructions or computer code contained therein. One or more transceiver 716 and 726 may be provided, and each device may also include an antenna, respectively illustrated as 717 and 727. Although only one antenna each is shown, many antennas and multiple antenna elements may be provided to each of the devices. Other configurations of these devices, for example, may be provided. For example, network element 710 and UE 720 may be additionally configured for wired communication, in addition to wireless communication, and in such a case antennas 717 and 727 may illustrate any form of communication hardware, without being limited to merely an antenna.

Transceivers 716 and 726 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 720 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 720 may be a sensor or smart meter, or other device that may usually be configured for a single location.

In an exemplifying embodiment, an apparatus, such as a node or user device, may include means for carrying out embodiments described above in relation to any of FIGS. 2, 3, 4, 5, and/or 6.

Processors 714 and 724 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or unit of at least one chip set (e.g., procedures, functions, and so on). Memories 715 and 725 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 710 and/or UE 720, to perform any of the processes described above (see, for example, FIGS. 2, 3, 4, 5, and 6). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 7 illustrates a system including a network element 710 and a UE 720, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

LIST OF ABBREVIATIONS

3GPP 3rd generation partnership project
CP Control plane
eNB Evolved Node B, E-UTRAN Node B
EPC Evolved packet core
ETSI European telecommunications standards institute
GW Gateway
HSS Home subscriber server
ID Identity, Identifier
IP Internet protocol
ISG Industry specification group
LTE Long term evolution
MEC Mobile edge computing
MME Mobility management entity
PCRF Policy and charging rules function
P-GW Packet data network gateway
S-GW Serving gateway
SPR Subscription profile repository
UDR User data repository
UE User equipment
UP User plane

The invention claimed is:
1. A method, comprising:
initiating an attachment to a network;
indicating, while initiating the attachment, at least one user equipment request;
identifying at least one requested mobile edge computing service with the at least one user equipment request; and
completing attachment upon receiving an affirmative response from a network in response to the at least one user equipment request,
wherein the at least one user equipment request comprises
a request to limit access to mobile edge computing services only by identifying which mobile edge computing services are allowed or not allowed via the network, or
a request to limit access to mobile edge computing services and at least one of a limited set of core network services and/or applications and a limited set of packet data network gateway services and/or applications, by identifying which mobile edge computing services, limited set of core network services and/or limited set of packet data network gateway services are allowed or not allowed via the network.
2. The method of claim 1, wherein the at least one user equipment request comprises a request to prohibit access to at least one core network service or core network application.
3. The method of claim 1, further comprising:
prompting a user for input upon receiving a negative response from a network in response to the at least one user equipment request.
4. The method of claim 1, further comprising:
detaching upon receiving a negative response from a network in response to the at least one user equipment request.
5. The method of claim 4, further comprising:
reattaching to the network with at least one new parameter with respect to local mobile edge computing services or mobile edge computing applications.
6. A method, comprising:
receiving, for a network attachment, at least one user equipment request;
providing a response to the at least one user equipment request, wherein the response is configured to indicate a network capability with respect to the local mobile edge computing services or mobile edge computing applications; and
providing with the response, indication of support or unavailability for at least one mobile edge computing service,
wherein the at least one user equipment request comprises
a request to limit access to mobile edge computing services only by identifying which mobile edge computing services are allowed or not allowed via a network, or
a request to limit access to mobile edge computing services and at least one of a limited set of core network services and/or applications and a limited set of packet data network gateway services and/or applications, by identifying which mobile edge computing services, limited set of core network services and/or limited set of packet data network gateway services are allowed or not allowed via the network.
7. An apparatus, comprising:
at least one processor; and
at least one memory including computer program code,
wherein the at least one memory and the computer program code are configured, with the at least one processor, to cause the apparatus at least to:
initiate an attachment to a network;
indicate, while initiating the attachment, at least one user equipment request;
identify at least one requested mobile edge computing service with the at least one user equipment request; and complete attachment upon receiving an affirmative response from a network in response to the at least one user equipment request, wherein the at least one user equipment request comprises
- a request to limit access to mobile edge computing services only by identifying which mobile edge computing services are allowed or not allowed via the network, or
- a request to limit access to mobile edge computing services and at least one of a limited set of core network services and/or applications and a limited set of packet data network gateway services and/or applications, by identifying which mobile edge computing services, limited set of core network services and/or limited set of packet data network gateway services are allowed or not allowed via the network.

8. The apparatus of claim 7, wherein the at least one user equipment request comprises a request to prohibit access to at least one core network service or core network application.

9. The apparatus of claim 7, wherein the at least one memory and the computer program code are further configured, with the at least one processor, to cause the apparatus at least to:

prompt a user for input upon receiving a negative response from a network in response to the at least one user equipment request.

10. The apparatus of claim 7, wherein the at least one memory and the computer program code are further configured, with the at least one processor, to cause the apparatus at least to:

detach upon receiving a negative response from a network in response to the at least one user equipment request.

11. The apparatus of claim 10, wherein the at least one memory and the computer program code are further configured, with the at least one processor, to cause the apparatus at least to:

reattach to the network with at least one new parameter with respect to local mobile edge computing services or mobile edge computing applications.

12. An apparatus, comprising:

at least one processor; and at least one memory including computer program code, wherein the at least one memory and the computer program code are configured, with the at least one processor, to cause the apparatus at least to:

receive, for a network attachment, at least one user equipment request;

provide a response to the at least one user equipment request, wherein the response is configured to indicate a network capability with respect to the local mobile edge computing services or mobile edge computing applications; and provide with the response, indication of support or unavailability for at least one mobile edge computing service, wherein the at least one user equipment request comprises
- a request to limit access to mobile edge computing services only by identifying which mobile edge computing services are allowed or not allowed via a network, or
- a request to limit access to mobile edge computing services and at least one of a limited set of core network services and/or applications and a limited set of packet data network gateway services and/or applications, by identifying which mobile edge computing services, limited set of core network services and/or limited set of packet data network gateway services are allowed or not allowed via the network.

13. A computer program, embodied in a non-transitory computer-readable medium, the computer program configured to control a processor to perform a method according to claim 1.

14. A computer program, embodied in a non-transitory computer-readable medium, the computer program configured to control a processor to perform a method according to claim 6.

* * * * *